US012699460B2

(12) United States Patent (10) Patent No.: US 12,699,460 B2
Parida et al. (45) Date of Patent: Aug. 4, 2026

(54) MAGNITUDE DETERMINATION FOR SYSTEM COMMANDS IN A GESTURE RECOGNITION SYSTEM

(71) Applicant: Samsung Electronics Co., Ltd., Suwon-si (KR)

(72) Inventors: Priyabrata Parida, Dallas, TX (US); Vutha Va, Plano, TX (US); Boon Loong Ng, Plano, TX (US); Anum Ali, Frisco, TX (US); Saifeng Ni, Santa Clara, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 132 days.

(21) Appl. No.: 18/614,612

(22) Filed: Mar. 22, 2024

(65) Prior Publication Data

US 2025/0004563 A1 Jan. 2, 2025

Related U.S. Application Data

(60) Provisional application No. 63/523,481, filed on Jun. 27, 2023.

(51) Int. Cl.
| | |
|---|---|
| *G06F 3/01* | (2006.01) |
| *G01S 7/41* | (2006.01) |
| *G01S 13/88* | (2006.01) |

(52) U.S. Cl.
CPC .............. *G06F 3/017* (2013.01); *G01S 7/415* (2013.01); *G01S 13/88* (2013.01)

(58) Field of Classification Search
None
See application file for complete search history.

(56) References Cited

U.S. PATENT DOCUMENTS

| | | | |
|---|---|---|---|
| 9,159,116 B2 | 10/2015 | Plagemann et al. | |
| 10,564,799 B2 | 2/2020 | Holz | |
| 2009/0143141 A1* | 6/2009 | Wells | G07F 17/3239 |
| | | | 463/37 |
| 2015/0160849 A1* | 6/2015 | Weiss | G06F 3/04883 |
| | | | 345/174 |
| 2021/0223752 A1* | 7/2021 | Degani | G01S 7/4086 |
| 2022/0365207 A1* | 11/2022 | Corner | E05F 15/76 |
| 2022/0385804 A1 | 12/2022 | Holz | |

FOREIGN PATENT DOCUMENTS

| | | |
|---|---|---|
| CN | 115471917 A | 12/2022 |
| KR | 10-2021-0063118 A | 6/2021 |

* cited by examiner

*Primary Examiner* — Parul H Gupta

(57) ABSTRACT

An electronic device includes a transceiver configured to transmit and receive radar signals. The electronic device further comprises a processor operatively coupled to the transceiver. The processor is configured to adjust a field of view (FoV) associated with the transceiver based on a plurality of radar frames corresponding to the radar signals, extract a plurality of feature vectors from the plurality of radar frames based on the adjusted FoV. The processor is further configured to identify an activity based on the plurality of feature vectors, perform a gesture magnitude operation, and perform an action based on the gesture and a result of the gesture magnitude operation.

20 Claims, 12 Drawing Sheets

300

400

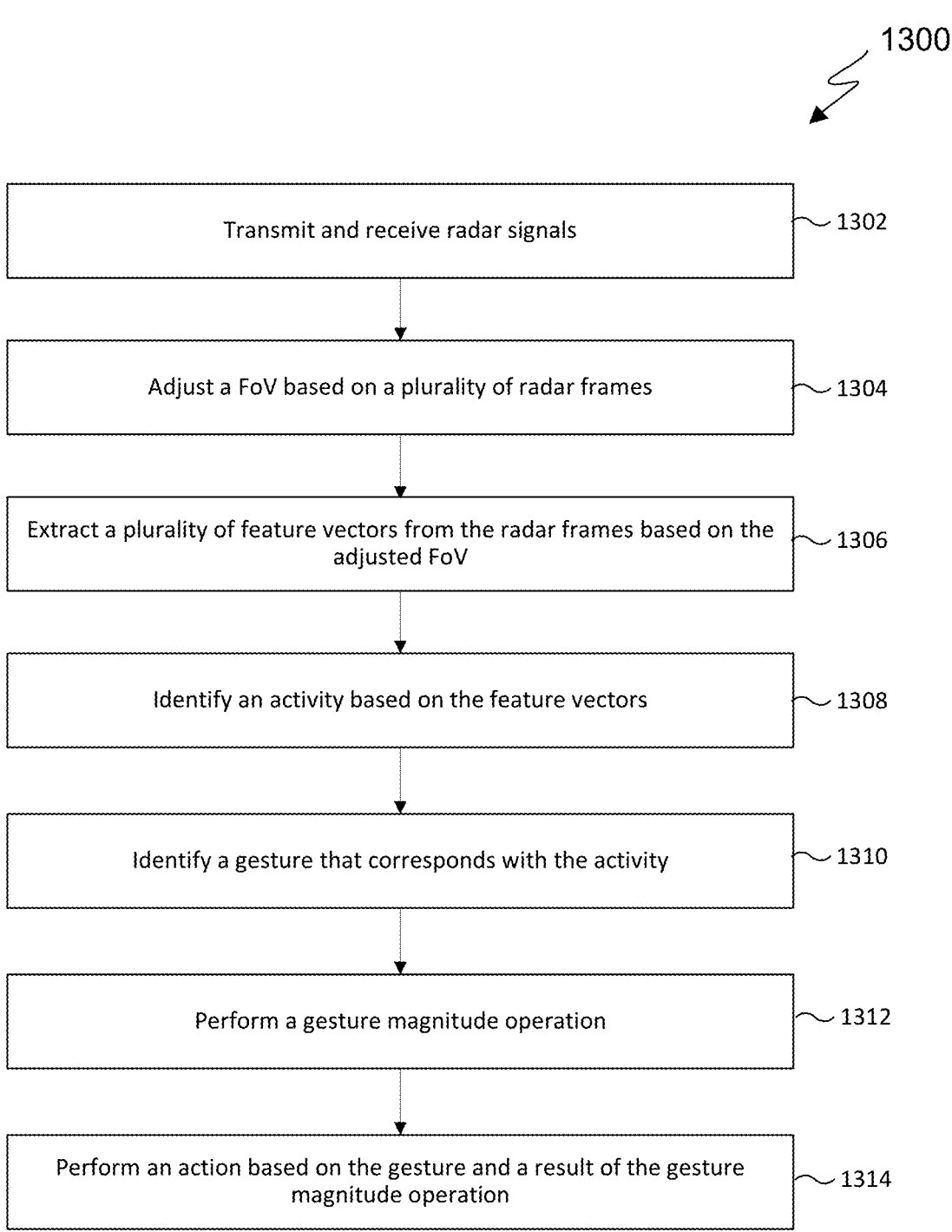

1300

Transmit and receive radar signals — 1302

Adjust a FoV based on a plurality of radar frames — 1304

Extract a plurality of feature vectors from the radar frames based on the adjusted FoV — 1306

Identify an activity based on the feature vectors — 1308

Identify a gesture that corresponds with the activity — 1310

Perform a gesture magnitude operation — 1312

Perform an action based on the gesture and a result of the gesture magnitude operation — 1314

FIG. 13

MAGNITUDE DETERMINATION FOR SYSTEM COMMANDS IN A GESTURE RECOGNITION SYSTEM

CROSS-REFERENCE TO RELATED APPLICATION AND CLAIM OF PRIORITY

This application claims priority under 35 U.S.C. § 119(e) to U.S. Provisional Patent Application No. 63/523,481 filed on Jun. 27, 2023. The above-identified provisional patent application is hereby incorporated by reference in its entirety.

TECHNICAL FIELD

This disclosure relates generally to electronic devices. More specifically, this disclosure relates methods and apparatuses to determine magnitude for system commands in a gesture recognition system.

BACKGROUND

Voice and gestural interactions are becoming increasingly popular in the context of ambient computing. These input methods allow the user to interact with digital devices, e.g., smart TVs, smartphones, tablets, smart home devices, AR/VR glasses etc., while performing other tasks, e.g., cooking and dining. Gestural interactions can be more effective than voice, particularly for simple interactions such as snoozing an alarm or controlling a multimedia player. For such simple interactions, gestural interactions have two main advantages over voice-based interactions, namely, complication and social-acceptability. First, the voice-based commands can often be long, and the user has to initiate with a hot word. Second, in quiet places and during conversations, the voice-based interaction can be socially awkward.

Gestural interaction with a digital device can be based on different sensor types, e.g., ultrasonic, IMU, optic, and radar. Optical sensors give the most favorable gesture recognition performance. The limitations of optic sensor based solutions, however, are sensitivity to ambient lighting conditions, privacy concerns, and battery consumption. Hence, optic sensor based solution have the inability to run for long periods of time. LIDAR based solutions can overcome some of these challenges such as lighting conditions and privacy, but the cost is still prohibitive (currently, only available in high-end devices).

SUMMARY

This disclosure provides methods and apparatuses to determine magnitude for system commands in a gesture recognition system.

In one embodiment, an electronic device is provided. The electronic device includes a transceiver configured to transmit and receive radar signals. The electronic device further comprises a processor operatively coupled to the transceiver. The processor is configured to adjust a field of view (FoV) associated with the transceiver based on a plurality of radar frames corresponding to the radar signals, extract a plurality of feature vectors from the plurality of radar frames based on the adjusted FoV. The processor is further configured to identify an activity based on the plurality of feature vectors, perform a gesture magnitude operation, and perform an action based on the gesture and a result of the gesture magnitude operation.

In another embodiment, a method of operating an electronic device is provided. The method includes transmitting and receiving radar signals, adjusting a field of view FoV associated with a transceiver comprised by the electronic device based on a plurality of radar frames corresponding to the radar signals, and extracting a plurality of feature vectors from the plurality of radar frames based on the adjusted FoV. The method further includes identifying an activity based on the plurality of feature vectors, identifying a gesture that corresponds with the activity, performing a gesture magnitude operation, and performing an action based on the gesture and a result of the gesture magnitude operation.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 13 illustrates a method for a gesture recognition system according to embodiments of the present disclosure.

DETAILED DESCRIPTION

FIGS. 1 through 13, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged gesture recognition system.

Figure 1:
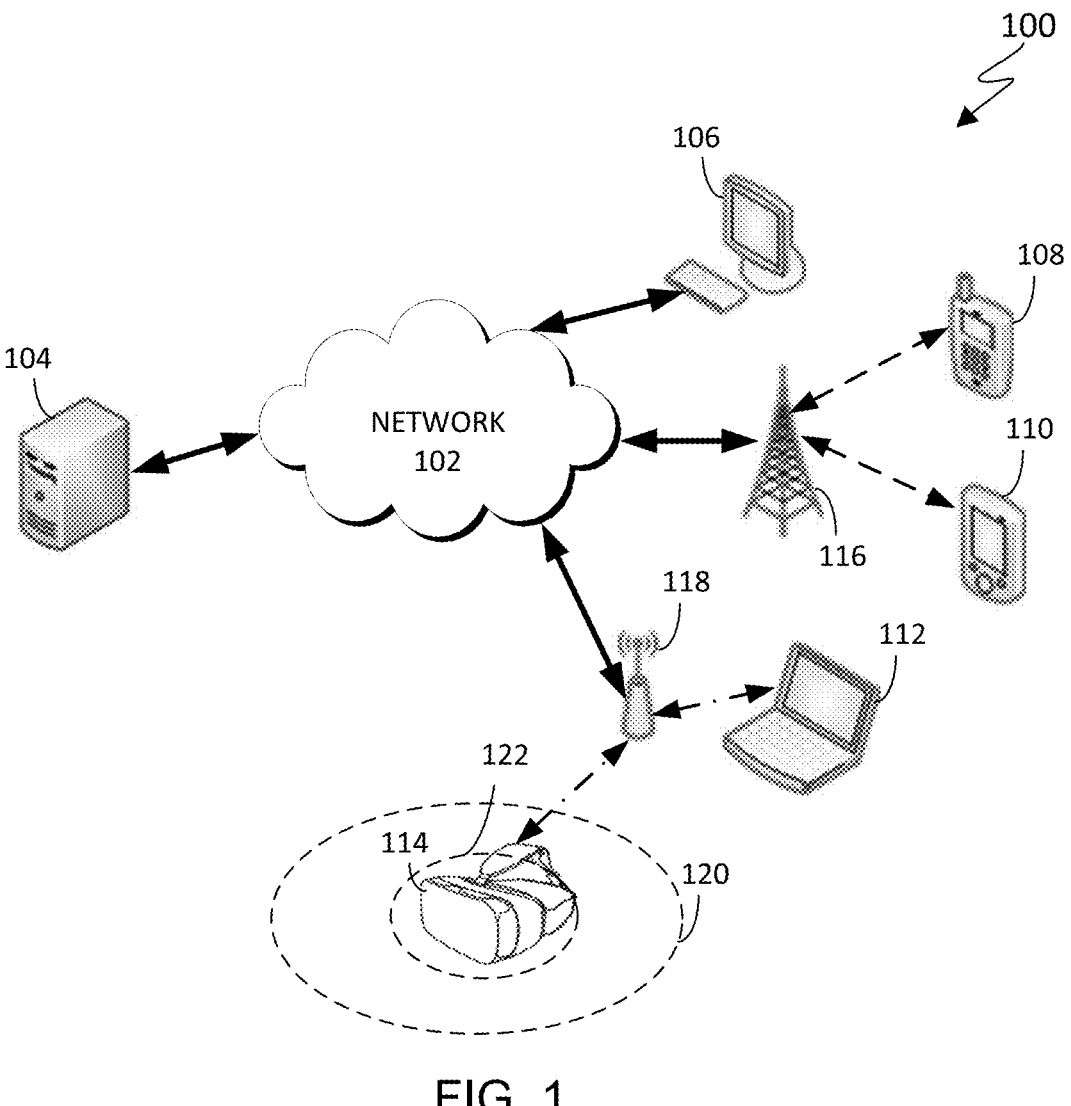
FIG. 1 illustrates an example communication system according to embodiments of the present disclosure.

FIG. 1 illustrates an example communication system according to embodiments of the present disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, AR/VR glasses, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and AR/VR glasses 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a radar transceiver. In certain embodiments, the client devices 106-114 are able to sense the presence of an object located close to the client device and determine whether the location of the detected object is within a first area 120 or a second area 122 closer to the client device than a remainder of the first area 120 that is external to the second area 122. In certain embodiments, the boundary of the second area 122 is at a predefined proximity (e.g., 5 centimeters away) that is closer to the client device than the boundary of the first area 120, and the first area 120 can be a within a different predefined range (e.g., 30 meters away) from the client device where the user is likely to perform a gesture.

In this example, some client devices 108 and 110-114 communicate indirectly with the network 102. For example, the mobile device 108 and PDA 110 communicate via one or more base stations 116, such as cellular base stations or eNodeBs (eNBs) or gNodeBs (gNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
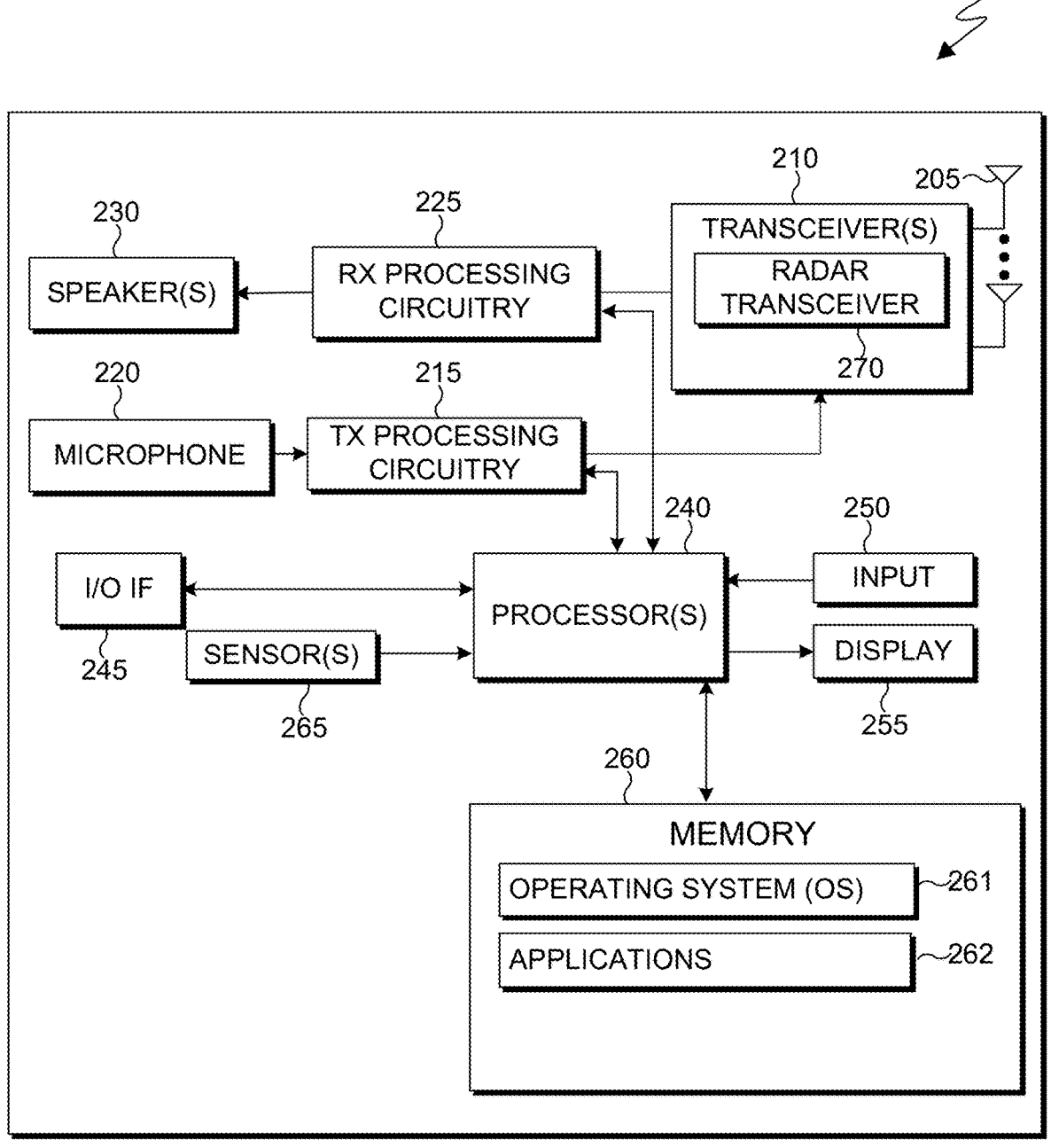
FIG. 2 illustrates an example electronic device according to embodiments of the present disclosure.

FIG. 2 illustrates an example electronic device according to embodiments of the present disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the AR/VR glasses 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array 205 including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, 6G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of downlink (DL) channel signals and the transmission of uplink (UL) channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 can include a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active-matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

The electronic device 200 as used herein can include a transceiver that can both transmit and receive radar signals. For example, the transceiver(s) 210 includes a radar transceiver 270, as described more particularly below. In this embodiment, one or more transceivers in the transceiver(s) 210 is a radar transceiver 270 that is configured to transmit and receive signals for detecting and ranging purposes. For example, the radar transceiver 270 may be any type of transceiver including, but not limited to a WiFi transceiver, for example, an 802.11ay transceiver. The radar transceiver 270 can operate both radar and communication signals concurrently. The radar transceiver 270 includes one or more antenna arrays, or antenna pairs, that each includes a transmitter (or transmitter antenna) and a receiver (or receiver antenna). The radar transceiver 270 can transmit signals at a various frequencies. For example, the radar transceiver 270 can transmit signals at frequencies including, but not limited to, 6 GHZ, 7 GHz, 8 GHZ, 28 GHz, 39 GHz, 60 GHz, and 77 GHz. In some embodiments, the signals transmitted by the radar transceiver 270 can include, but are not limited to, millimeter wave (mmWave) signals. The radar transceiver 270 can receive the signals, which were originally transmitted from the radar transceiver 270, after the signals have bounced or reflected off of target objects in the surrounding environment of the electronic device 200. In some embodiments, the radar transceiver 270 can be associated with the input 250 to provide additional inputs to the processor 240.

Figure 3:
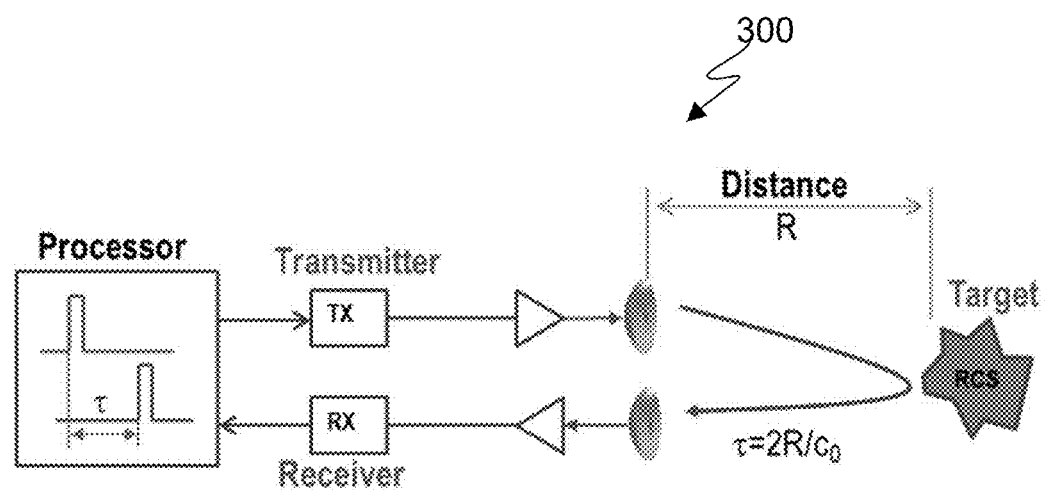
FIG. 3 illustrates an example monostatic radar according to embodiments of the present disclosure.

In certain embodiments, the radar transceiver 270 is a monostatic radar. A monostatic radar includes a transmitter of a radar signal and a receiver, which receives a delayed echo of the radar signal, which are positioned at the same or similar location. For example, the transmitter and the receiver can use the same antenna or nearly co-located while using separate, but adjacent antennas. Monostatic radars are assumed coherent such that the transmitter and receiver are synchronized via a common time reference. FIG. 3, below, illustrates an example monostatic radar.

In certain embodiments, the radar transceiver 270 can include a transmitter and a receiver. In the radar transceiver 270, the transmitter of can transmit millimeter wave (mmWave) signals. In the radar transceiver 270, the receiver can receive the mmWave signals originally transmitted from the transmitter after the mmWave signals have bounced or reflected off of target objects in the surrounding environment of the electronic device 200. The processor 240 can analyze the time difference between when the mmWave signals are transmitted and received to measure the distance of the target objects from the electronic device 200. Based on the time differences, the processor 240 can generate an image of the object by mapping the various distances.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

A common type of radar is the "monostatic" radar, characterized by the fact that the transmitter of the radar signal and the receiver for its delayed echo are, for all practical purposes, in the same location.

FIG. 3 illustrates an example monostatic radar 300 according to embodiments of the present disclosure. The embodiment of a monostatic radar 300 of FIG. 3 is for illustration only. Different embodiments of a monostatic radar 300 could be used without departing from the scope of this disclosure.

In the example of FIG. 3, a high level architecture is shown for a common monostatic radar, i.e., the transmitter and receiver are co-located, either by using a common antenna, or are nearly co-located, while using separate, but adjacent antennas. Monostatic radars are assumed coherent, i.e., transmitter and receiver are synchronized via a common time reference.

In a monostatic radar's most basic form, a radar pulse is generated as a realization of a desired "radar waveform", modulated onto a radio carrier frequency and transmitted through a power amplifier and antenna (shown as a parabolic antenna), either omni-directionally or focused into a particular direction. Assuming a "target" at a distance R from the radar location and within the field-of-view of the transmitted signal, the target will be illuminated by RF power density $p_t$ (in units of $W/m^2$) for the duration of the transmission. The first order, $p_t$ can be described as:

$$p_t = \frac{P_T}{4\pi R^2} G_T = \frac{P_T}{4\pi R^2} \frac{A_T}{\left(\lambda^2/4\pi\right)} = P_T \frac{A_T}{\lambda^2 R^2},$$

where:

$P_T$ . . . transmit power [W], $G_T, A_T$ . . . transmit antenna gain [dBi], effective aperture area [$m^2$], $\lambda$ . . . wavelength of the radar signal RF carrier signal [m], R target distance [m].

In this example, effects of atmospheric attenuation, multipath propagation, antenna losses, etc. have been neglected.

The transmit power density impinging onto the target surface will lead to reflections depending on the material composition, surface shape, and dielectric behavior at the frequency of the radar signal. Note that off-direction scattered signals are typically too weak to be received back at the radar receiver, so only direct reflections will contribute to a detectable receive signal. In essence, the illuminated area(s) of the target with normal vectors pointing back at the receiver will act as transmit antenna apertures with directivities (gains) in accordance with their effective aperture area(s). The reflected-back power is:

$$P_{refl} = p_t A_t G_t \sim p_t A_t r_t \frac{A_t}{(\lambda^2/4\pi)} = p_t RCS,$$

where:

P_{refl} . . . effective (isotropic) target-reflected power [W],

A_t, r_t, G_t . . . effective target area normal to the radar direction [m²], reflectivity of the material & shape [0, . . . , 1], and corresponding aperture gain [dBi], RCS . . . Radar Cross Section [m²].

Note that the radar cross section, RCS, is an equivalent area that scales proportionally to the actual reflecting area-squared, inversely proportionally with the wavelength-squared and is reduced by various shape factors and the reflectivity of the material. For a flat, fully reflecting mirror of area A_t, large compared with $$\lambda^2, RCS = 4\pi A_t^2/\lambda^2.$$

Due to the material and shape dependency, it is generally not possible to deduce the actual physical area of a target from the reflected power, even if the target distance is known.

The target-reflected power at the receiver location results from the reflected-power density at the reverse distance R, collected over the receiver antenna aperture area:

$$P_R = \frac{P_{refl}}{4\pi R^2} A_R = P_T \cdot RCS \frac{A_T A_R}{4\pi\lambda^2 R^4},$$

where:

P_R . . . received, target-reflected power [W],

A_R . . . receiver antenna effective aperture area [m²], may be same as A_T.

The radar system is usable as long as the receiver signal exhibits sufficient signal-to-noise ratio (SNR), the particular value of which depends on the waveform and detection method used. Generally, in its simplest form:

$$SNR = \frac{P_R}{kT \cdot B \cdot F},$$

where:

kT . . . Boltzmann's constant x temperature [W/Hz],

B . . . radar signal bandwidth [Hz],

F . . . receiver noise factor (degradation of receive signal SNR due to noise contributions of the receiver circuit itself).

In case the radar signal is a short pulse of duration (width) $T_P$, the delay t between the transmission and reception of the corresponding echo will be equal to $\tau=2R/c$, where c is the speed of (light) propagation in the medium (air). In case there are several targets at slightly different distances, the individual echoes can be distinguished as such only if the delays differ by at least one pulse width, and hence the range resolution of the radar will be $\Delta R=c\Delta\tau/2=cT_P/2$. Further considering that a rectangular pulse of duration $T_P$ exhibits a power spectral density $P(f)\sim(\sin(\pi f T_P)/(\pi f T_P))^2$ with the first null at its bandwidth $B=1/T_P$, the range resolution of a radar is fundamentally connected with the bandwidth of the radar waveform via:

$$\Delta R = c/2B.$$

Although FIG. 3 illustrates an example of a monostatic radar 300, various changes may be made to FIG. 3. For example, various changes to transmitter, the receiver, the processor, etc. could be made according to particular needs.

The superior spatial and Doppler resolution of Millimeter wave (mmWave) radars has opened up new horizons for human-computer interaction (HCI), where smart devices, such as smartphones, can be controlled through micro-gestures. Gesture-based control of these devices may be enabled by a gesture recognition module (GRM) as shown in FIG. 4.

Figure 4:
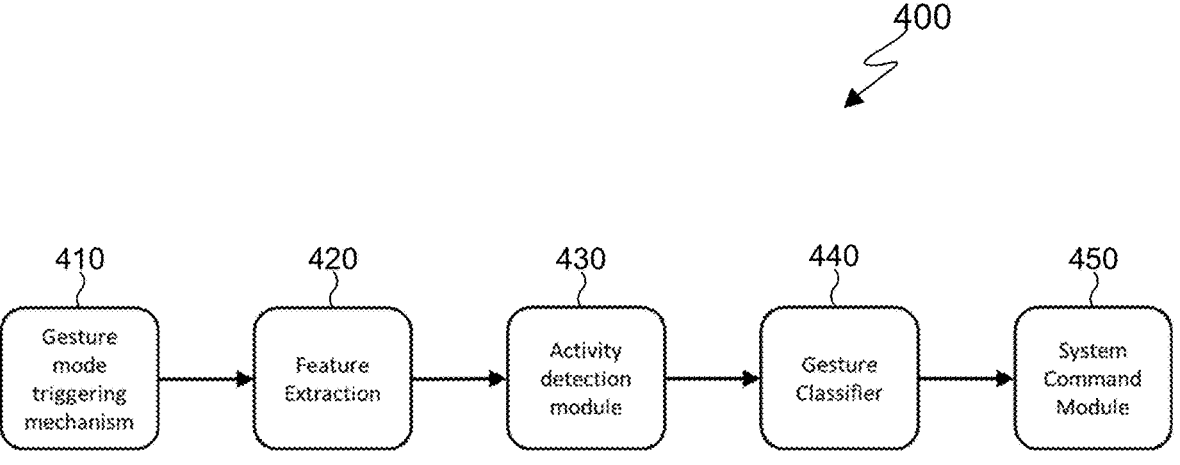
FIG. 4 illustrates a block diagram for an example gesture recognition module according to embodiments of the present disclosure.

FIG. 4 illustrates a block diagram 400 for an example gesture recognition module according to embodiments of the present disclosure. The embodiment of a GRM of FIG. 4 is for illustration only. Different embodiments of a GRM could be used without departing from the scope of this disclosure.

In the example of FIG. 4, the GRM includes multiple functional blocks that leverage many machine learning-based models for the accurate identification and classification of a valid gesture activity performed by the user. For example, the GRM includes a gesture mode triggering mechanism 410. Gesture mode triggering mechanism 410 may be implemented in several ways. For gesture mode triggering mechanism 410 could be based on proximity detection and/or active applications, etc. In proximity detection-based triggering, the gesture mode is activated only when an object in close proximity to the radar is detected. The proximity detection mode can itself be based on the radar used for gesture detection. The benefit of triggering the gesture mode based on proximity detection comes in reduced power consumption. It is expected that a simpler task of proximity detection can be achieved reliably with radar configurations that have low power consumption. It is only when an object is detected in radar's proximity, that a switch is made to the gesture detection mode, which could be based on a radar configuration that consumes more power. Another possibility for triggering the gesture mode is application based. As an example, dynamic finger gestures may be used with just a few applications, and as such, the gesture mode can be triggered when the user is actively using the application exploiting gestural interaction.

The GRM further includes feature extraction module 420. Once the gesture mode is triggered, the incoming raw radar data is first processed by feature extraction module 420 to extract feature vectors from the raw radar data including Time-velocity diagram (TVD), Time-angle diagram (TAD), and Time-elevation diagram (TED).

The GRM further includes an activity detection module (ADM) 430 and a gesture classifier 440. The task of ADM 430 is to detect the end of an activity based on the feature vectors and trigger gesture classifier 440. The task of gesture classifier 440 is to correctly identify a gesture associated with the activity performed by the user based on the input from ADM 430.

The GRM further includes a system command module 450, which interprets the gesture identified by gesture classifier 440 into a system command, and performs an action related to the system command associated with the gesture.

Although FIG. 4 illustrates a block diagram 400 for an example gesture recognition module, various changes may be made to FIG. 4. For example, various changes to the number of modules, the type of modules, etc. could be made according to particular needs.

Figure 5:
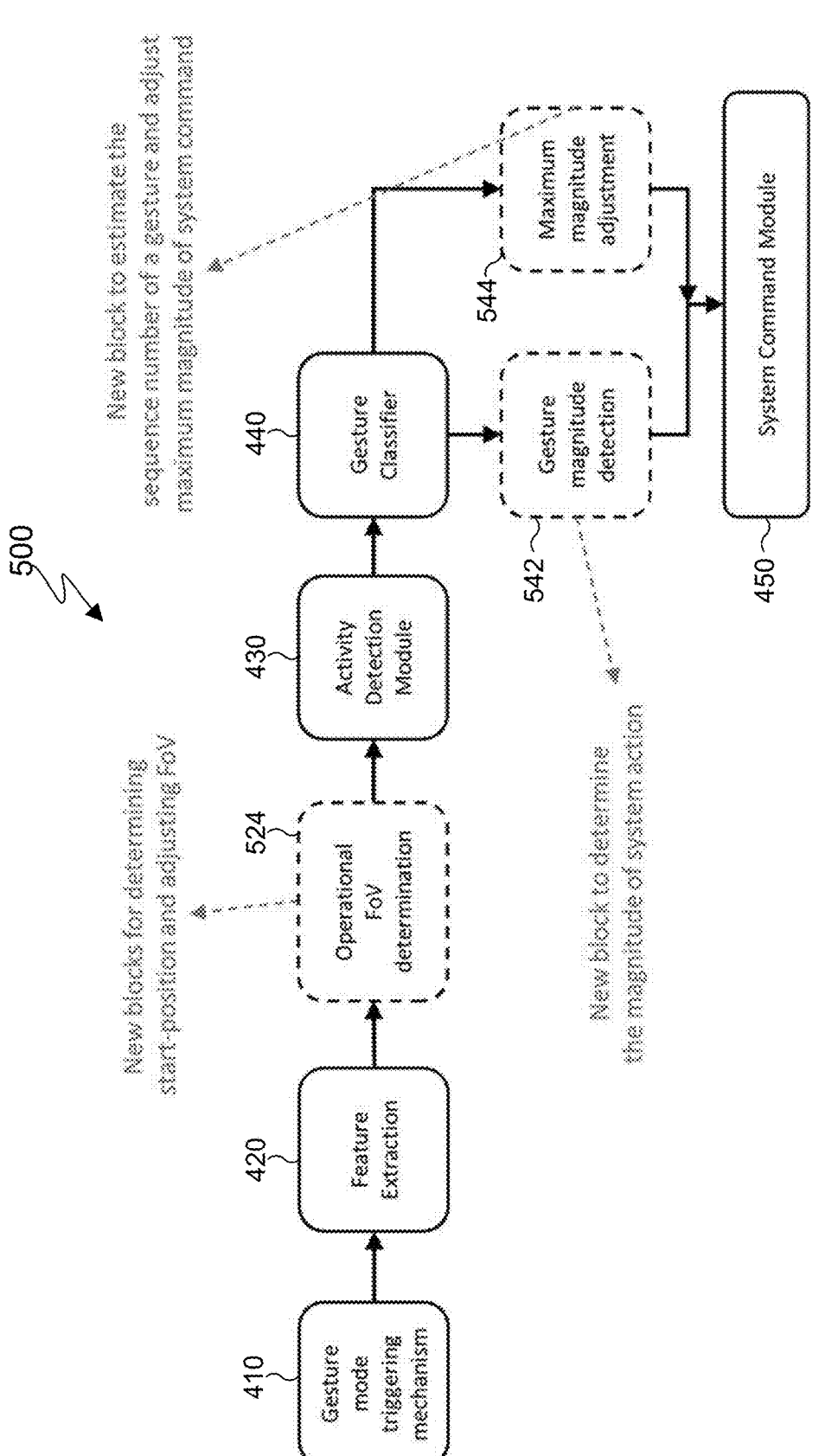
FIG. 5 illustrates a block diagram for an example gesture recognition module according to embodiments of the present disclosure.

Most gesture recognition systems are limited to identifying the gesture and performing the associated system command without any consideration for the "intensity" of the gesture that may be intentional by the user. For example, for increasing the audio volume of the device by a significant amount the user may perform a faster gesture compared to the case where the user needs only a smaller increase in the audio volume. In another example, a user may perform a sequence of repeated gestures to increase the volume rapidly. In this case, increasing the audio volume by the same amount for each gesture in the sequence may not be an efficient solution from the user experience perspective. FIG. 5 shows an extension for the mmWave gesture recognition solution described in FIG. 4 that can adaptively adjust the magnitude of change for a specific system command based on certain contextual information derived from the performed gesture. For example, depending on the position of a particular gesture in the sequence, the amount of increase in the audio volume by that gesture can be adaptively changed. The embodiments of the present disclosure enable a gesture recognition system where the magnitude of certain system commands can be adaptively adjusted based on the physical metric derived from the associated gesture that triggers the command.

FIG. 5 illustrates a block diagram 500 for an example gesture recognition module according to embodiments of the present disclosure. The embodiment of a GRM of FIG. 5 is for illustration only. Different embodiments of a GRM could be used without departing from the scope of this disclosure.

In the example of FIG. 5, the GRM includes the gesture mode triggering mechanism 410, feature extraction module 420, ADM 430, gesture classifier 440, and system command module 450 of FIG. 4. The GRM further includes operational FoV determination module 524 for estimating the start-position of the target and subsequently determining the operational FoV, and gesture magnitude detection module 542, and maximum magnitude adjustment module 544 for estimating the gesture magnitude that is used to get the magnitude of system action. For example, gesture magnitude detection module 542 may perform a magnitude detection operation, and maximum magnitude adjustment module may perform a magnitude adjustment operation.

Although FIG. 5 illustrates a block diagram 500 for an example gesture recognition module, various changes may be made to FIG. 5. For example, various changes to the number of modules, the type of modules, etc. could be made according to particular needs.

Figure 6:
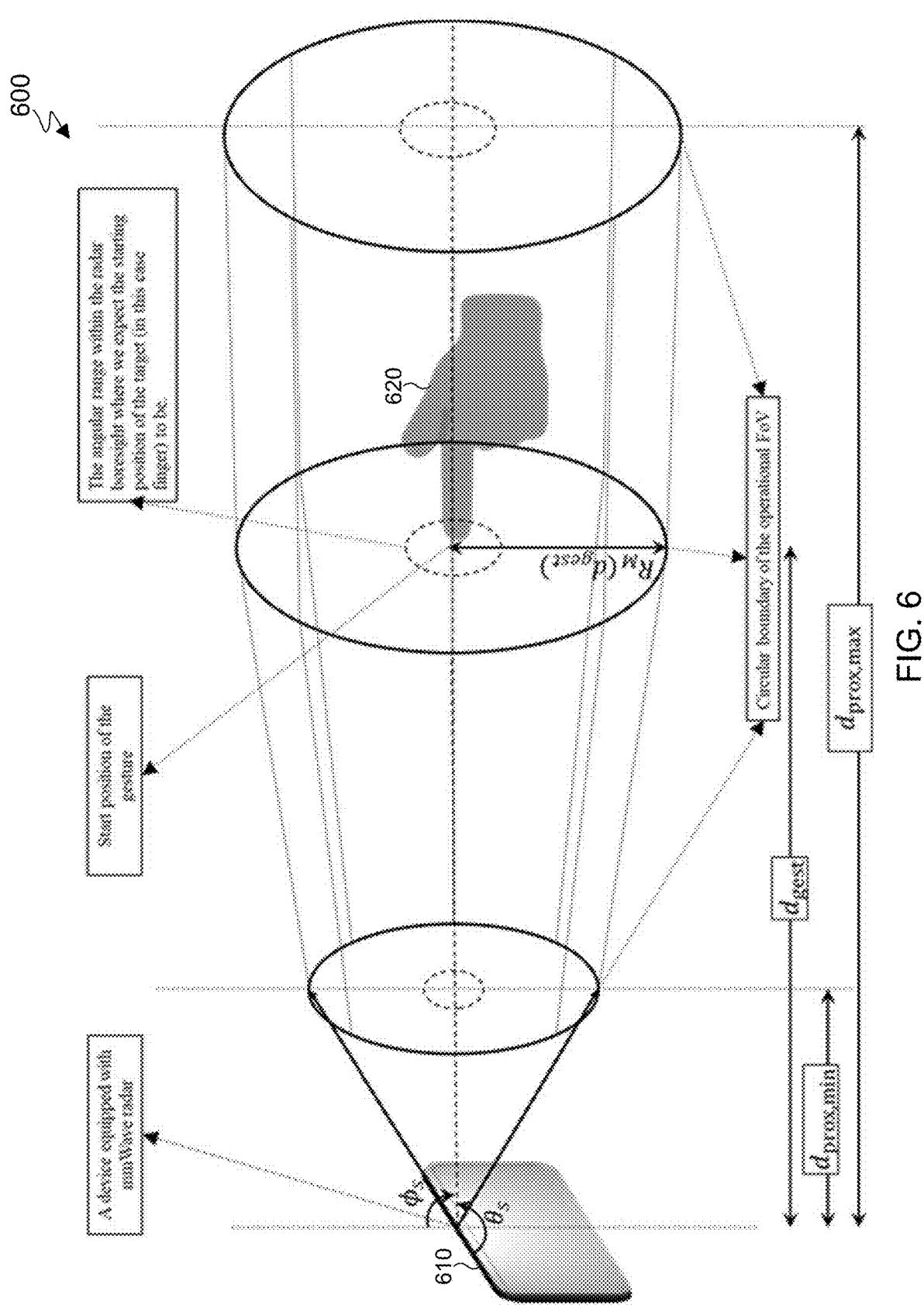
FIG. 6 illustrates an example of an operational FoV of a mmWave radar according to embodiments of the present disclosure.

FIG. 6 illustrates an example 600 of an operational FoV of a mmWave radar according to embodiments of the present disclosure. The embodiment of an operation FoV of FIG. 6 is for illustration only. Different embodiments of an operational FoV could be used without departing from the scope of this disclosure.

In the example of FIG. 6, an electronic device 610 equipped with mmWave radar is capturing radar frames of a target 620, located within an operational FoV of the mm Wave radar. However, it should be understood that the principles in the example of FIG. 6 may be applied to radars operating in other frequency ranges with appropriate and straightforward modifications.

Figure 8:
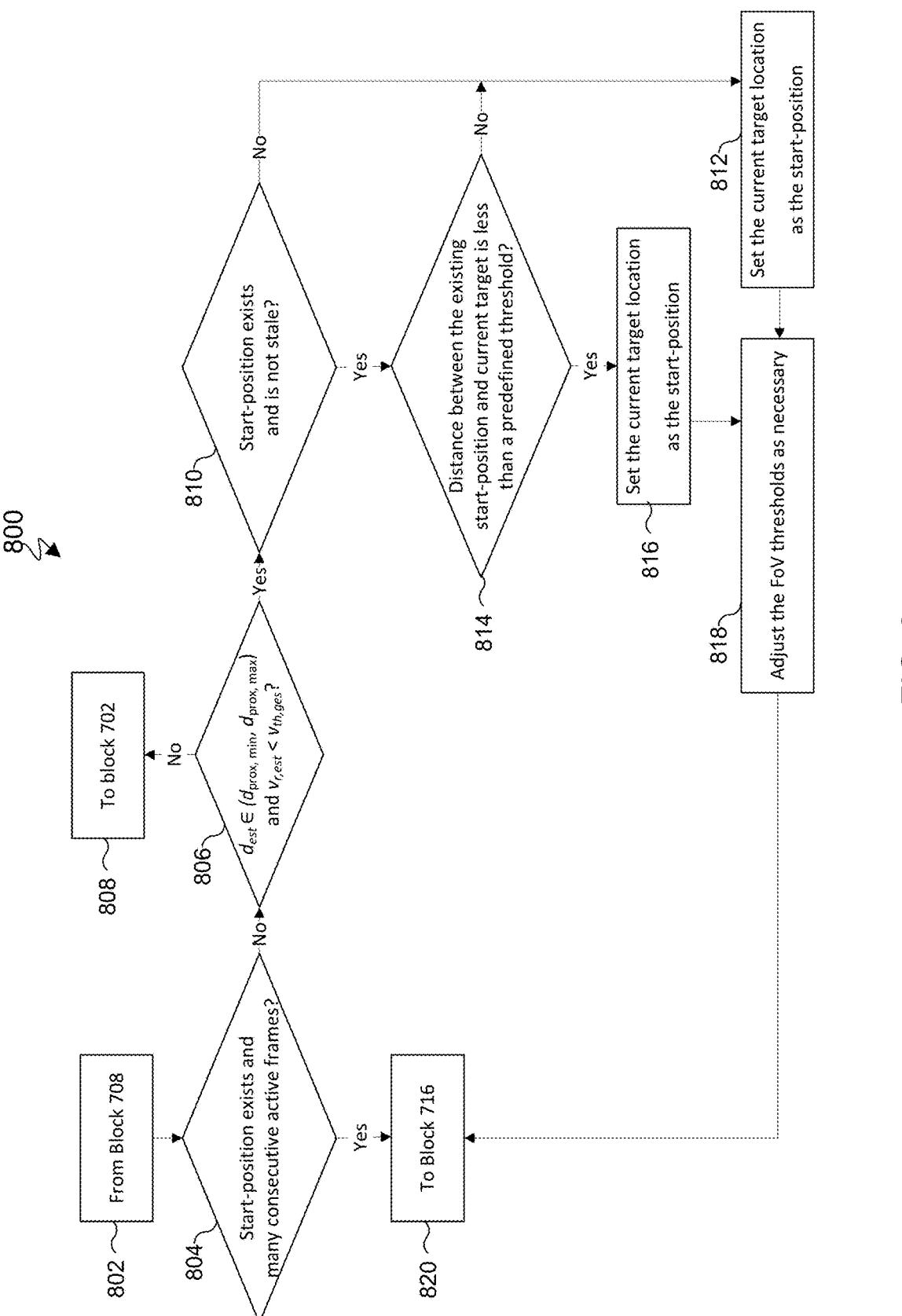
FIG. 8 illustrates a process for determining a start-position and adjusting an operational FoV according to embodiments of the present disclosure.

As shown in FIG. 6, a user of electronic device 610 may perform a gesture within a specified distance from electronic device 620. For instance, when target 620 (i.e., the user's fist/finger) is within the range of distances ($d_{prox,min}$, $d_{prox,max}$) the user may perform a gesture. Once the user is within the specified range of distances, the "start-position" of a potential gesture is determined. An example process flow for determining the start-position is illustrated in FIG. 8. The general concept is that when target 620 is within the proximity of electronic device 610 and the target velocity is sufficiently low, then it may be an indication that the user is about to perform a gesture. Hence, the current position could be the start-position for the gesture.

If the start-position is within a specified angular range of the radar boresight location, then a virtual circular boundary is determined. The radius of this boundary is proportional to the target distance. Ideally, the entire motion of the gesture should be within the non-uniform cylindrical region as shown in FIG. 6. This region is referred to herein as the "operational FoV". At a given distance, the radius $R_M$ of the circular plane in the operational FoV is proportional to the maximum magnitude for the system command trigged by a gesture. For example, if a particular gesture is performed for scrolling up or down a webpage, then the maximum amount of scrolling that can occur by a single gesture is proportional to $R_M$. Any displacement of target 620 larger than $R_M$ from the start position may not result in a larger amount of scrolling than the predefined maximum amount of scroll. If the displacement of target 620 when the user performs the gesture is $\delta R_M$, where $\delta \in (0, 1]$, then the scroll amount is adjusted as $\delta$ of the predefined maximum scroll. The radius $R_M$ may also be a function of the gesture distance $d_{gest}$. For closer distances, it may be desirable to have a smaller $R_M$ to ensure that the target measurements are performed within a predefined "system FoV" of the radar. In the system FoV, the error between the true target location and the estimated target location is expected to be low. This is because radar systems are well calibrated within a specified angular range of the boresight location. Further, the antenna gain degrades significantly as target 620 moves away from the radar boresight location. This may lead to poor angle estimation accuracy due to low signal-to-noise ratio. Hence, beyond the system FoV, there may be a larger error between the true and estimated target location due to poor calibration and hardware limitations. The maximum value of $R_M(d_{gest}) \forall d_{gest} \in (d_{prox,min}, d_{prox,max})$ should ensure that operational FoV is a subset of the system FoV to avoid any potential larger errors in the estimated physical metrics.

Although FIG. 6 illustrates an example 600 of an operational FoV of a mmWave radar, various changes may be made to FIG. 6. For example, various changes to the operational FoV, the type of electronic device, etc. could be made according to particular needs.

Figure 7:
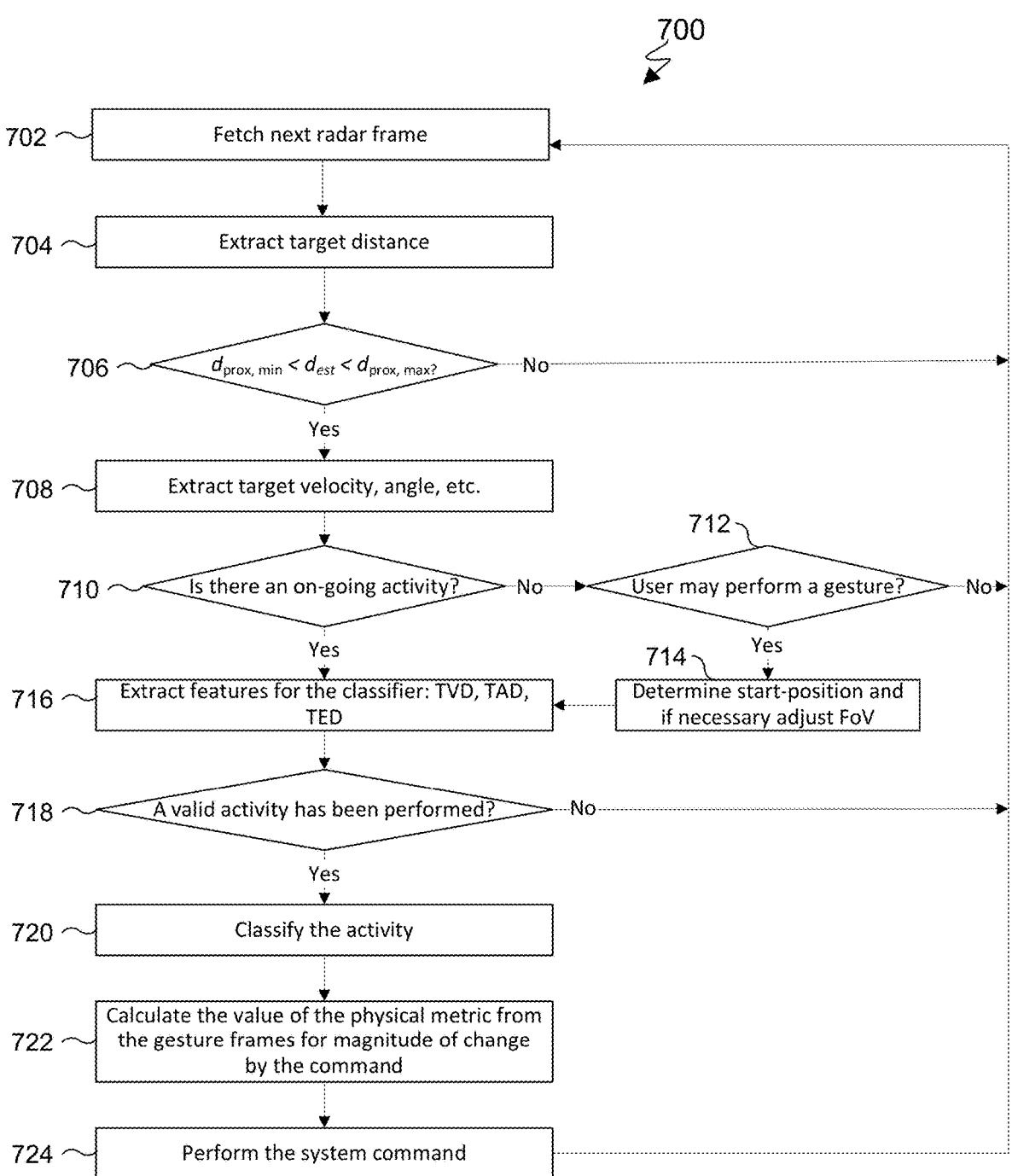
FIG. 7 illustrates a process for a gesture recognition system according to embodiments of the present disclosure.

FIG. 7 illustrates a process 700 for a gesture recognition system according to embodiments of the present disclosure. An embodiment of the method illustrated in FIG. 7 is for illustration only. One or more of the components illustrated in FIG. 7 may be implemented in specialized circuitry configured to perform the noted functions or one or more of the components may be implemented by one or more processors executing instructions to perform the noted functions. Other embodiments of a process 700 for a gesture recognition system could be used without departing from the scope of this disclosure.

In the example of FIG. 7, the radar senses the presence of a target by periodically transmitting a frame that constitutes a set of pulses (block 702). In this stage, the distance of the target from the radar is estimated (block 704). In the event where a target (e.g., finger/fist of a user) is present in the proximity of the radar, i.e., $d_{est} \in (d_{prox,min}, d_{prox,max})$ (block 706), the device estimates a set of additional physical attributes of the target such as velocity, azimuth angle, and elevation angle (block 708). If the target velocity is relatively small (block 710), then it may be inferred that the user is about to perform a gesture (block 712). Hence, the start-position is determined (block 714) defined by the spherical coordinates $(d_s, \theta_s, \phi_s)$, where $d_s \approx d_{gest}$, $\theta_s$ and $\phi_s$ are respectively the azimuth and elevation angle of the target at the start-position. If the target is closer to the boresight location of the radar, i.e., $\theta_s \approx 90°$ and $\phi_s \approx 90°$, then the radius of the circular FoV is set based on $d_s$. In contrast, if $(\theta_s, \phi_s)$ is beyond a certain thresholds $\theta_{th}$ and $\phi_{th}$ from the boresight location of the radar, either of the following approaches may be followed:

1. Approach-1: The boundary of the operational FoV is determined by considering its center as $(d_s \sin \phi_s \sin \theta_s, d_s \sin \phi_s \cos \theta, d_s \cos \phi)$ and the radius $R_M$ is set as determined by $d_s$. This operation FoV should be contained within the system FoV.
2. Approach-2: The user may be prompted to move towards the boresight location of the radar defined by the coordinates $(d_s, 0, 0)$. In this case, the user may be guided either via a display on the screen or a voice-based guidance system.

The thresholds $\theta_{th}$ and $\phi_{th}$ can be set to relatively smaller values compared to the angular spread of the operation FoV given by a tan $$\left( \frac{R_M(d_{gest})}{d_{gest}} \right).$$

For example, if the angular spread of the operation FoV is 60° then $\theta_{th}$ and $\phi_{th}$ can be set to 3°, which is five percent of the angular spread of the FoV.

After the above operation the user may perform a gesture defined in the gesture vocabulary. Using certain features such as Time-velocity diagram (TVD), time-azimuth angle diagram (TAD), and time-elevation angle diagram (TED) (block 716), a classifier such as gesture classifier 440 classifies the desired activity (block 720) after it is determined that a valid activity has been performed (block 718). In the next step (block 722), certain additional physical metrics are calculated, such as the maximum displacement of the target, and the maximum velocity of the target, to determine the magnitude of the system command associated with the gesture. Thereafter, the system command is performed (block 724) based on the determined magnitude.

Although FIG. 7 illustrates one example of a process 700 for a gesture recognition system, various changes may be made to FIG. 7. For example, while shown as a series of steps, various steps in FIG. 7 could overlap, occur in parallel, occur in a different order, or occur any number of times.

In the example of FIG. 7, in each frame the first task is to obtain the target distance (block 704). Once the target is within a predefined distance-based proximity range (block 708), then three other physical attributes are calculated: target radial velocity, target azimuth angle, and target elevation angle (block 708). The thresholds $(d_{prox,min}, d_{prox,max})$ to determine whether a target is in the proximity may depend on the operation and radar configuration parameters. For example, if the desired operation is for micro-gesture recognition, then it is expected that the user will perform the gesture relatively closer to the device, which can be a smart watch. In this case, it may be considered that $(d_{prox,min}=1$ cm, $d_{prox,max}=10$ cm). In contrast, if the desired operation is for macro-gesture recognition, then it is expected that the user will perform the gesture relatively farther from the device, which can be a smart hub. In this case, it may be considered that $(d_{prox,min}=10$ cm, $d_{prox,max}=100$ cm).

Once the target is within the proximity established by the distance criteria, by continuously monitoring the target velocity and angular information, it may be inferred when the user is likely to perform a gesture and accordingly the start-position of the gesture may be determined.

In the present disclosure, it is considered that a frame includes $N_c$ number of pulses where each radar pulse provides one measurement of the channel impulse response (CIR), which includes $N_s$ delay bins (or equivalently range bin). The power in each bin of the Range-Doppler map (RDM) $R_{DM} \in \mathbb{R}^{N_c \times N_s}$ is obtained by first taking the discrete Fourier transform (DFT) across pulses. Next, the power on each bin is computed by taking the square of the absolute value of the complex number on each bin. Another intermediate quantity of interest that is derived from the RDM is the range profile $r_p \in \mathbb{R}^{N_s}$, which is defined as $$r_p[j] = \sum_{i=1}^{N_c} R_{DM}[i, j], \text{ for } j = 1, 2, \ldots, N_s.$$

The RDM and range profile may be obtained using the data from all the antennas that are present in the radar. Once the range profile is obtained, the distance is estimated by the following equation:

$$d_{est} = C_d \frac{1}{\sum_{k=max(0,n-1)}^{min(n+1,N_s)} r_P[k]} \sum_{k=max(0,n-1)}^{min(n+1,N_s)} k r_p[k],$$

where the target peak is located at the n-th range bin and $C_d$ is the distance resolution. The distance can also be estimated using an appropriate interpolation method such as sinc, parabolic, or successive parabolic interpolation. For example, if the peak is located at the n-th range bin, then sinc or parabolic functions could be used along with the range profile values between the range bin n−1 to n+1 to estimate the target distance. The estimated distance is later used for determining the azimuth and elevation angular velocities.

To estimate the radial velocity, the information in the n-th column of $R_{DM}$ may be used (assuming the peak corresponding to the target is located at the n-th column). In order to avoid amplifying noise, the elements of $R_{DM}[:,n]$ may be set, which represents the n-th column of $R_{DM}$, that are below the predefined noise threshold $T_{noise}$ to zero, i.e., $$R_{DM}[r, n] = \begin{cases} R_{DM}[r, n], & \text{if } R_{DM}[r, n] > T_{noise} \\ 0, & \text{if } R_{DM}[r, n] \le T_{noise} \end{cases}.$$

Now, the average estimated radial velocity of the target is given as $$v_r = C_v \frac{1}{\sum_{r=-\frac{N_c}{2}}^{\frac{N_c}{2}-1} R_{DM}[r, n]} \sum_{r=-\frac{N_c}{2}}^{\frac{N_c}{2}-1} r R_{DM}[r, n].$$

The estimated velocity of the target for this particular frame is added to a first-in-first-out (FIFO) buffer $v_r$ that holds the radial velocity feature.

Using the data available at multiple antennas and the knowledge of the peak where the target is located, the angular power spectrum of the target may be estimated using appropriate spectrum estimation method such as DFT or a multiple signal classification (MUSIC) algorithm. For each frame, the azimuth and elevation angular power spectrums may be stored in a TAD and a TED, respectively, that will be used by the classifier in subsequent processes. Both of these variables are two-dimensional matrices where each column holds the estimated angular spectrum for a given frame. To estimate the average angular velocity of the target in the azimuth/elevation dimension, information regarding the angular location of the target over two consecutive frames is used. In one example, $TAD[:,f] \in \mathbb{R}^{N_g}$ denotes the TAD column corresponding to the f-th frame and $N_g$ is the grid size that may cover the angular range within the system FoV or the entire 180° in front of the radar in the azimuth plane. It may also be considered that the $N_g$ grid covers angular range more than the system FoV and less than the azimuth plane. For this column, the target angle may be obtained as the peak of the angle spectrum for the column f.

$$\hat{\theta}[f] =$$

$$\min\left(\operatorname{argmax} TAD[:,f], \operatorname{atan}\left(\frac{R_M(d_{est})}{d_{est}}\right)\right)1\left(\operatorname{argmax} TAD[:,f] \geq \frac{\pi}{2}\right) +$$

$$\max\left(\operatorname{argmax} TAD[:,f], \operatorname{atan}\left(\frac{R_M(d_{est})}{d_{est}}\right)\right)1\left(\operatorname{argmax} TAD[:,f] < \frac{\pi}{2}\right),$$

where $d_{est}$ is the estimated distance of the target and movement of the gesture outside of the operational FoV is neglected.

Alternately, $\hat{\theta}[f]$ may be estimated as a weighted sum of power values corresponding to each angle which is given as $$\hat{\theta}[f] =$$

$$\min\left(\frac{\sum_{i=1}^{N_c} \theta_i TAD[i,f]}{\sum_{i=1}^{N_c} TAD[i,f]}, \operatorname{atan}\left(\frac{R_M(d_{ges})}{d_{ges}}\right)\right)1\left(\frac{\sum_{i=1}^{N_c} \theta_i TAD[i,f]}{\sum_{i=1}^{N_c} TAD[i,f]} \geq \frac{\pi}{2}\right) +$$

$$\max\left(\frac{\sum_{i=1}^{N_c} \theta_i TAD[i,f]}{\sum_{i=1}^{N_c} TAD[i,f]}, \operatorname{atan}\left(\frac{R_M(d_{ges})}{d_{ges}}\right)\right)1\left(\frac{\sum_{i=1}^{N_c} \theta_i TAD[i,f]}{\sum_{i=1}^{N_c} TAD[i,f]} < \frac{\pi}{2}\right).$$

Similarly, the elevation angular location $\hat{\phi}[f]$ may be estimated for the frame f. The estimated azimuth and elevation angles are stored in respective FIFO buffers denoted as $\hat{\theta}$ and $\hat{\phi}$. In some scenarios, such as low signal-to-noise ratio or in presence of reflection from many points from the fist/hand of the user, $\hat{\theta}[f]$ and $\hat{\phi}[f]$ may not give an accurate estimate of the angular location of the desired target, i.e., the finger of the user. In such scenarios, it may be advantageous to have a moving average for the estimation of these quantities. In one example, the moving average can be a low pass filter that may filter any spurious and incorrectly estimated angle.

Once the information regarding the angular location for the current and past frames are available, the tangential velocity may be estimated using the following procedure. First the change in angle between two consecutive frames is determined. For the azimuth case, this can be given as $\Delta_\theta[f] = \hat{\theta}[f] - \hat{\theta}[f-1]$. For instance, the estimated distance of the target between these two frames can be $d_{est}[f]$. This can be average of the target distance between these two frames. Alternatively, a moving average of the target distance over past few frames can also be used for $d_{est}[f]$. Now, the angular displacement of the target between these two frames can be given as $$d_{ang}^{az}[f] = d_{est}[f]\Delta_\theta[f].$$

Using the information on the frame separation period $T_f$, the azimuth tangential velocity may be estimated for this particular frame as $$v_{az}[f] = \frac{d_{ang}^{az}[f]}{T_f}.$$

Following a similar process, the elevation tangential velocity may be estimated as $$v_{el}[f] = \frac{d_{ang}^{el}[f]}{T_f},$$

where $$d_{ang}^{el}[f]$$

is the angular displacement of the target between frame f and f−1. Both the estimated quantities $v_{az}[f]$ and $v_{el}[f]$ are stored in respective FIFO buffers denoted as $v_{az}$ and $v_{el}$.

In the example of FIG. 7, once the target attribute has been extracted, a check is performed to determine if there is an on-going activity (block 710). The determination may be made using the following criteria: the start-position has already been determined (in a past frame) and the ADM has detected the start of an activity. In this case, the ADM may be based on an energy-based active frame counter to declare the start of an activity. For example, if the total energy on a given frame is more than a threshold it is classified as an active frame. If the ADM encounters many such consecutive frames, it may declare the start of an activity. In the present disclosure it is assumed that the ADM operates with high accuracy.

If there is no on-going activity, then the start-position of the gesture is determined (block 714) after inferring that the user may perform a gesture (block 712) based on the following criteria:

The target distance is within ($d_{prox,min}$, $d_{prox,max}$).

The target velocity is less than $v_{th,ges}$. For a micro-gesture, i.e., finger level, this threshold can be set to a low value such as 5 cm/sec. In contrast, for macro-gestures, i.e., hand level, it can be set to a higher value such as 10 cm/sec. The threshold also depends on the minimum Doppler resolution, which depends on the pulse repetition frequency. Additionally, the threshold may also depend on the minimum velocity associated with a gesture in the vocabulary.

Next, depending on the scenario, either the start-position of the previous activity is used as the start-position for the current activity, or a new start position is determined. In one example, where the user finished performing a gesture in the last few frames (e.g., 0.5 sec-1 sec), the user's hand has come to rest after that. In this case, a start-position may already exist from the previous gesture. In this scenario, the "existing" start-position may be set as the start-position for the next activity if the distance between the current target location and the existing start-position is below a certain threshold. In contrast, if the distance between the current target location and the existing start-position is above the threshold, then the current target location may be set as the start-position for the next activity. Once a new start position is determined, the thresholds for the operational FoV boundary may need to be adjusted appropriately.

In some other scenarios, the previous start-position may be stale or there may not be a prior start-position. For example, either a long time has passed since the previous activity (e.g., more than 10 seconds) or the target (user's fist/finger) was initially outside the proximity range. In these cases, the current target location may be set as the current start-position and the FoV boundary may be appropriately adjusted, similar as illustrated in in FIG. 8.

FIG. 8 illustrates a process 800 for determining a start-position and adjusting an operational FoV according to embodiments of the present disclosure. An embodiment of the method illustrated in FIG. 8 is for illustration only. One or more of the components illustrated in FIG. 8 may be implemented in specialized circuitry configured to perform the noted functions or one or more of the components may be implemented by one or more processors executing instructions to perform the noted functions. Other embodiments of a process 800 for determining a start-position and adjusting an operational FoV could be used without departing from the scope of this disclosure.

As illustrated in FIG. 8, the process 800 begins at block 802. Block 802, corresponds with block 708 of FIG. 7. At block 804, the electronic device determines if a start-position exists and there have been many consecutive active frames. If this is determined to be the case, the process proceeds to block 820 which corresponds with block 716 of FIG. 7. Otherwise, at block 806, the electronic device determines whether $d_{est} \in (d_{prox, min}, d_{prox, max})$ and $v_{r,est} < v_{th,ges}$. If this is determined not to be the case, the process proceeds to block 808 which corresponds with block 702 of FIG. 7. Otherwise, at block 810, the electronic device determines whether a start-position exists, and if the start-position exists whether the start position is not stale. If this is not the case, the process proceeds to block 812. Otherwise, the process proceeds to block 814. At block 812, the electronic device sets the current target location as the start-position. At block 814, the electronic device determines whether the distance between the existing start-position and the current target is less than a predefined threshold. If this is determined not to be the case, the process proceeds to block 812. Otherwise, the process proceeds to block 816. At block 816, the electronic device sets the current target location as the start-position. At block 818, the electronic device adjusts the FoV thresholds as necessary and proceeds to block 820.

Although FIG. 8 illustrates one example of a process 800 for determining a start-position and adjusting an operational FoV, various changes may be made to FIG. 8. For example, while shown as a series of steps, various steps in FIG. 8 could overlap, occur in parallel, occur in a different order, or occur any number of times.

In the event that the distance between the current target position and the existing start-position is more than the threshold, instead of setting the current target location as the start-position, the user may be prompted to move the target (e.g., fist/finger) towards the boresight location of the radar. Moreover, in certain applications, it may be desirable to have the start position at a specific distance from the radar, e.g., for gestures with relatively large radial movement it may be desirable to start at the middle of the proximity range $(d_{prox,min}, d_{prox,max})$ so that the entire gesture is contained within this range. This may also be true for gestures that may require relatively large angular displacements from the users. Once the target position has moved to the desired position, a minor adjustment to the thresholds of the circular FoV boundary may be necessary. Such a process is illustrated in FIG. 9, which may serve as an alternative to block 816 of FIG. 8.

Figure 9:
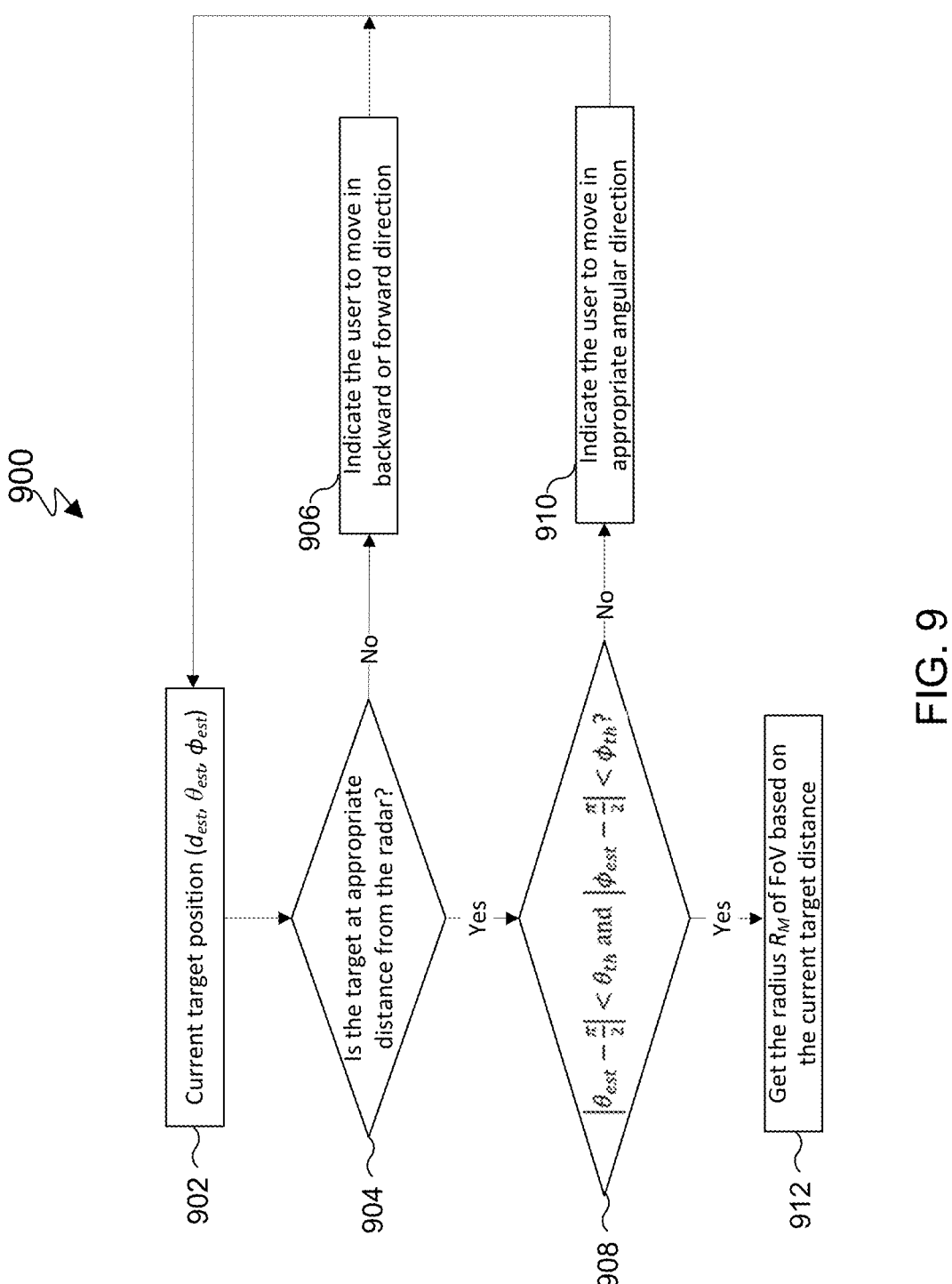
FIG. 9 illustrates a process for prompting a user to adjust a target position according to embodiments of the present disclosure.

FIG. 9 illustrates a process 900 for prompting a user to adjust a target position according to embodiments of the present disclosure. An embodiment of the method illustrated in FIG. 9 is for illustration only. One or more of the components illustrated in FIG. 9 may be implemented in specialized circuitry configured to perform the noted functions or one or more of the components may be implemented by one or more processors executing instructions to perform the noted functions. Other embodiments of a process 900 for prompting a user to adjust a target position could be used without departing from the scope of this disclosure.

In the example of FIG. 9, the radial and angular location of the target is iteratively adjusted by prompting (e.g., via an output device) the user to move in the appropriate direction. The prompt can be vision based where a device screen may display the direction to move. Alternatively, an audio-based prompt may also be provided to the user. Once the target has reached the desired position, a slight adjustment to the FoV thresholds may be performed. However, in most cases it may not be necessary as the target is already close to the boresight location of the radar.

As illustrated in FIG. 9, the process 900 begins at block 902. At block 902, the target has a current target position $(d_{est}, \theta_{est}, \phi_{est})$. At block 904, the electronic device determines whether the target is at an appropriate distance from the radar. If this is determined not to be the case, the process proceeds at block 906. Otherwise, the process proceeds at block 908. At block 908, the electronic device indicates for the user to move in a backward direction or forward direction with respect to the radar. At block 908, the electronic device determines whether $$\left| \theta_{est} - \frac{\pi}{2} \right| < \theta_{th} \text{ and } \left| \phi_{est} - \frac{\pi}{2} \right| < \phi_{th}.$$

If this is determined not to be the case, the process proceeds at block 910. Otherwise, the process proceeds at block 912. At block 910, the electronic device indicates for the user to move in an appropriate angular direction with respect to the radar. At block 912, the electronic devices gest the radius $R_M$ of the FoV based on the current target distance.

Although FIG. 9 illustrates one example of a process 900 for prompting a user to adjust a target position, various changes may be made to FIG. 9. For example, while shown as a series of steps, various steps in FIG. 9 could overlap, occur in parallel, occur in a different order, or occur any number of times.

In the example of FIG. 7, once the start-position is determined, for each frame, the TVD, TAD, and TED features are extracted and augmented (block 716). The extraction of the features may be similar to that of the processes described herein regarding for block 704 (for TVD) and 708 (for TAD, TED).

These features are later used by the ADM (e.g., ADM 430) (block 718) and the classifier (e.g., gesture classifier 440) (block 720) to detect the gestural activity performed by the user. For example, in a rule-based ADM, the power on each frame of the TVD is compared to the noise floor to mark if the frame contains an activity or just a noise frame. Once the ADM encounters the noise frames after encountering many active frames, the ADM may declare the end of an activity. Alternatively, the ADM may be a machine learning module that is trained using appropriate data to declare the end of an activity.

Similarly, using the TVD, TAD and TED features a classifier can be trained to classify the gestures in the vocabulary. Additionally, the classifier may also be trained to reject any type of non-gesture activities.

Once the activity has been identified, based on certain physical metrics associated with the activity, the magnitude of the system action is determined (block 722). Depending on the efficiency of operation of the ADM and the classifier, some of the gestures may get classified incorrectly (i.e., false negative). Further, some of the non-gestures may get classified as a valid gesture (i.e., false positive). The present disclosure describes later herein gestures and relevant features that minimize the impact on system action from false negatives and false positives.

Once the gesture is accurately identified, the appropriate physical signature may be extracted so that the magnitude of adjustment for the system function can be determined. An example gesture set in which physical signatures may be extracted is illustrated in FIG. 10.

Figure 10:
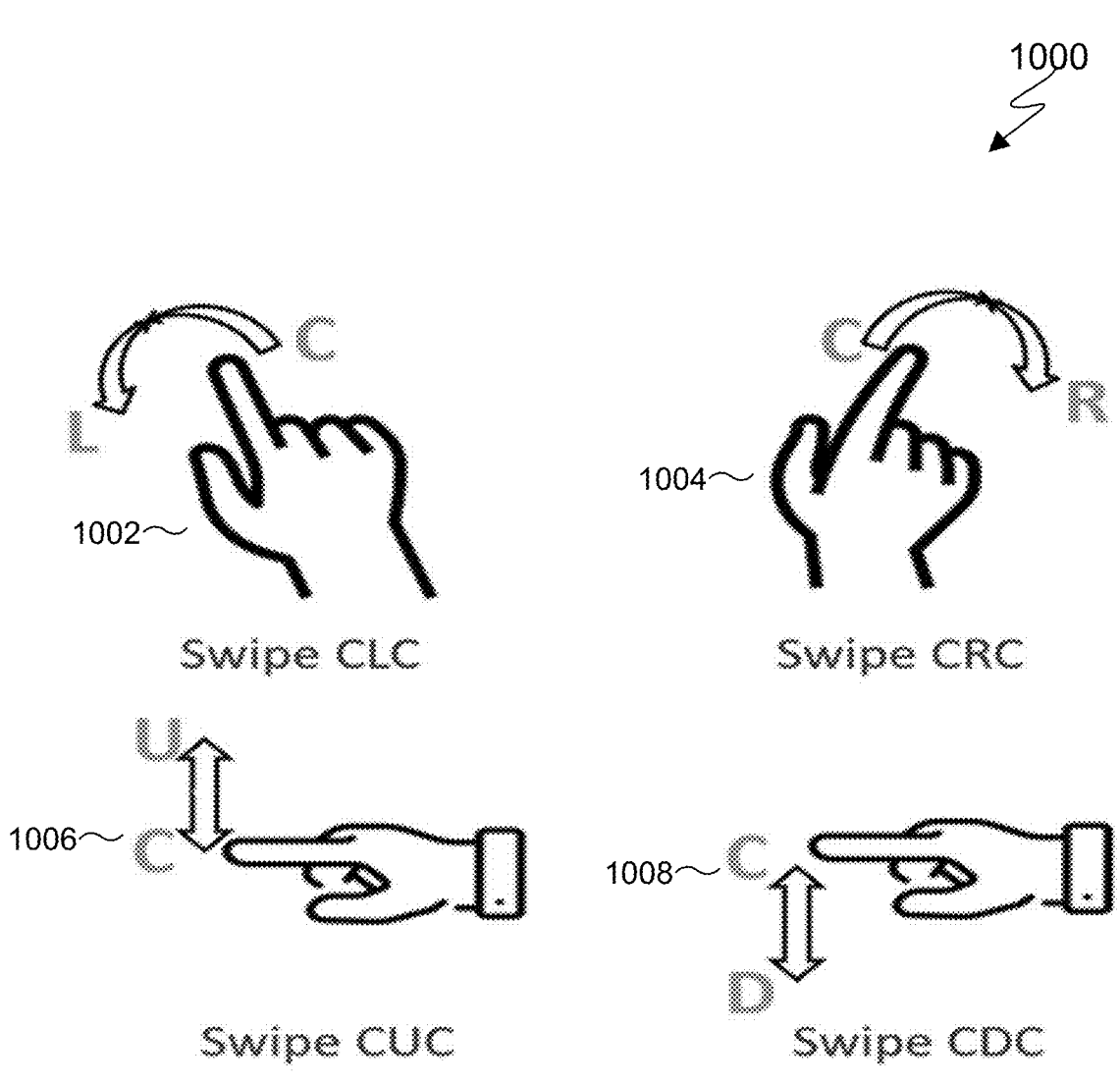
FIG. 10 illustrates an example gesture set according to embodiments of the present disclosure.

FIG. 10 illustrates an example gesture set 1000 according to embodiments of the present disclosure. The embodiment of a gesture set of FIG. 10 is for illustration only. Different embodiments of a gesture set could be used without departing from the scope of this disclosure.

FIG. 10 illustrates a set of four gestures including: Swipe Center-Left-Center (CLC) 1002, Swipe Center-Right-Center (CRC) 1004, Swipe Center-Up-Center (CUC) 1006, and Swipe Center-Down-Center (CDC) 1008.

The physical signatures should be selected in such a manner that in the event of inaccurate classification, the magnitude of adjustment is low. The present disclosure considers the following example of gesture set 1000 and associated functions:

1. S-CUC 1006 for scrolling up and S-CDC 1008 for scrolling down. Alternatively, it may be possible to configure S-CUC for volume up and S-CDC for volume down.

2. S-CRC 1004 for sliding the progress bar associated with media content forward. S-CLC 1002 for sliding the progress bar backward.

Although FIG. 10 illustrates an example gesture set 1000, various changes may be made to FIG. 10. For example, various changes to the number of gestures, the type of gestures, etc. could be made according to particular needs.

Figure 11:
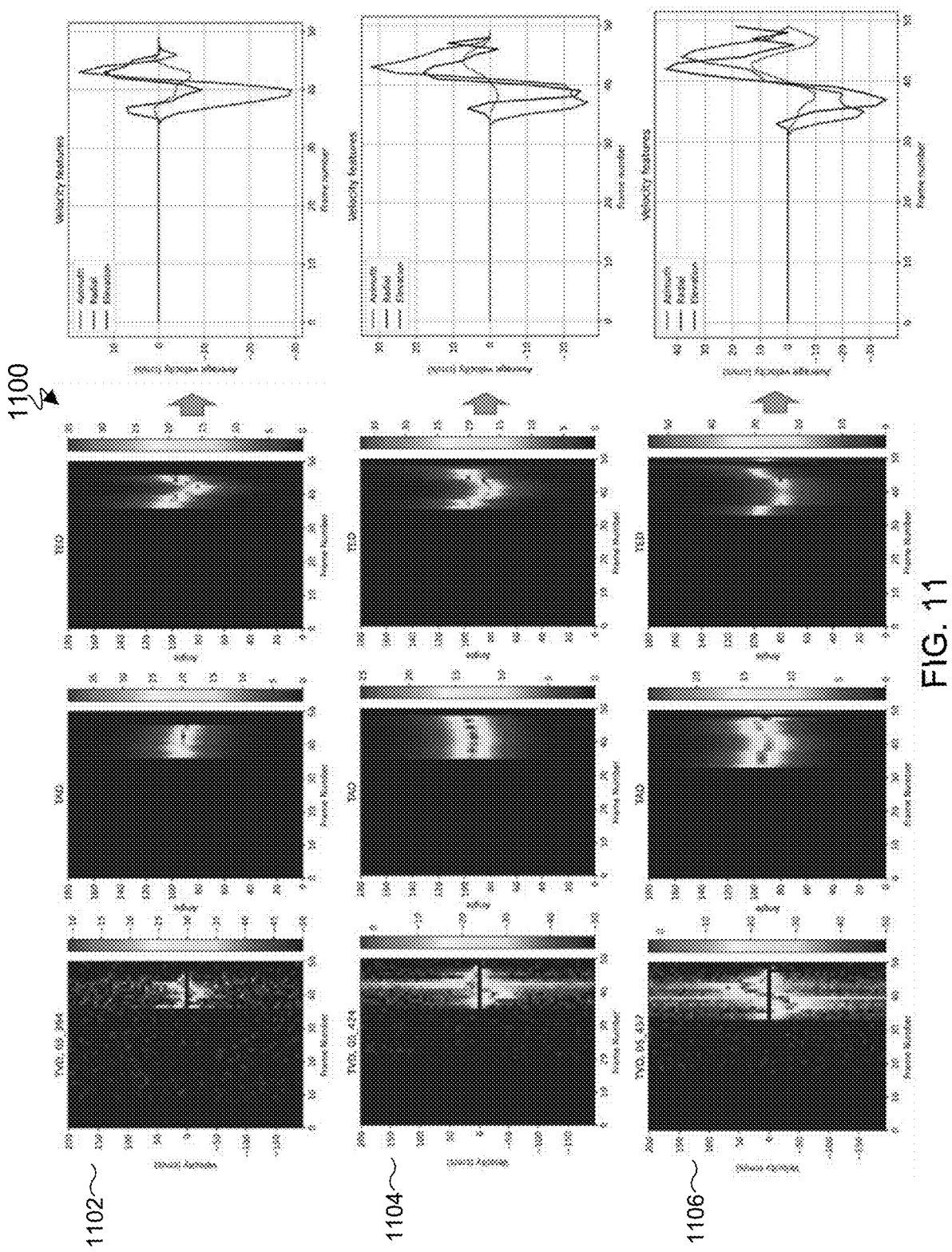
FIG. 11 illustrates an example of relevant features for the magnitude adjustment in a particular system function according to embodiments of the present disclosure.

A few illustrations of the mapping between the gesture and associated physical quantity are presented in FIG. 11.

FIG. 11 illustrates an example 1100 of relevant features for the magnitude adjustment in a particular system function according to embodiments of the present disclosure. The embodiment of relevant features of FIG. 11 is for illustration only. Different embodiments of relevant features for the magnitude adjustment in a particular system function could be used without departing from the scope of this disclosure.

The example of FIG. 11 illustrates three variations of a S-CUC gesture that may be used for scrolling down functionality for a particular app. In variation 1102, the user performed a S-CUC motion with relatively smaller movement in the fist/finger. Appreciable variation in the TED may be observed. However, the TVD has relatively weaker signal. In variation 1104, the user performed the gesture relatively faster and for a longer duration. It can be observed that the variation in the TED lasts for longer duration compared to variation 1102. Further, in the TVD, higher radial velocity can be observed. In variation 1106, the user performed the gesture with even higher speed. The TED variation can be observed to be of similar magnitude and similar duration compared to variation 1104. However, the variation in TVD is much more prominent compared to variations 1102 and 1104.

Once the gesture has been identified by the classifier, it may be advantageous to determine the first and last frame of the gesture. In one embodiment of this process, some active frames are culled due to clutter that may not be a part of the gesture. For example, once the gesture is detected, the set of consecutive active frames may be selected that contain 90% of the total energy of the TVD considered by the classifier. To determine the magnitude of change corresponding to a gesture, any combination of the following physical attributes may be considered (for simpler exposition, the S-CUC is considered as an example).

For instance, maximum displacement ($D_e$) of the target (e.g., finger/fist) in the elevation and azimuth may be used to determine the magnitude of change. In one embodiment, $v_{el}[i]$ is the tangential velocity in the elevation direction during i-th frame and $t_f$ is the frame duration. The distance traveled by the target during the first half of the gesture is expressed as $$D_e = \max\left(R_M(d_{ges}), t_f \sum\nolimits_{i=I_f}^{I_l} 1(v_{el}[i] < -\delta_{th})|v_{el}[i]|\right),$$

where $I_f$ and $I_l$ represent the first and last frame index corresponding to the gesture, and $\delta_{th}>0$ is a threshold used to negate the contributions from noise frames what may have smaller negative velocity. Note that as illustrated in variation 1102 of FIG. 11, for S-CUC the elevation tangential velocity during the first half of the motion is negative. The above equation captures this fact in calculating the maximum displacement. For S-CDC gesture, the maximum physical displacement may be modified as $$t_f \sum\nolimits_{i=I_f}^{I_l} 1(v_{el}[i] > \delta_{th})v_{el}[i].$$

Similarly, for S-CLC, the maximum displacement may be calculated as $$t_f \sum\nolimits_{i=I_f}^{I_l} 1(v_{az}[i] > \delta_{th})v_{az}[i].$$

Another alternative metric to capture the maximum displacement in the elevation and azimuth direction is to consider the half the total distance travelled during the gesture, i.e., which may be evaluated as $$D_e = \frac{1}{2}\left(\max\left(R_M(d_{ges}), t_f \sum_{i=I_f}^{I_l} 1(v_{el}[i] < -\delta_{th})|v_{el}[i]|\right) + \max\left(R_M(d_{ges}), t_f \sum_{i=I_f}^{I_l} 1(v_{el}[i] > \delta_{th})|v_{el}[i]|\right)\right).$$

This is possible due to the symmetry of the gesture where each gesture's start and end positions are the same.

Maximum velocity ($V_{max,e}$) in the first half of the elevation velocity feature may also be used to determine the magnitude of change. For example, another alternative to capture the intensity of the gesture performed by the user is to consider the maximum velocity with which the user's finger is moving away from the screen during S-CUC gesture. This may be expressed as $$V_{max,e} = \max\{|v_{el}(i)|1(v_{el}(i) < -\delta_{th})|\}_{i=I_f}^{I_l}.$$

As described earlier herein, during the angle and velocity estimation process, a low pass filter may be used to filter of any spurious components. This aids in improving the accuracy of using maximum velocity for magnitude estimation. Similar to the maximum displacement case, maximum speed may be selected during the entire gesture. This alternate metric may be defined as $$V_{max,e} = \max\{|v_{el}(i)|\}_{i=I_f}^{I_l}.$$

The total sum of the displacement in the radial and azimuth direction may also be used to determine the magnitude of change. As can observed in variations 1104 and 1006 of FIG. 11, the total displacement in the elevation direction may not be sufficient to distinguish between two gesture samples with higher variation in the elevation direction. Therefore, it may be advantageous to consider the radial displacement as well. In this case, a composite equation may be used as a proxy for the total displacement in the radial-elevation plane during the first half of the gesture that is given as $$D_{e,r} = \max\left(R_M(d_{ges}), t_f \sum_{i=I_f}^{I_l} 1(v_{el}[i] < -\delta_{th})|v_{el}[i]|\right) +$$

$$t_f \sum_{i=I_f}^{I_l} 1(v_{el}[i] < -\delta_{th})|v_r[i]|.$$

For a S-CDC, either of the above metrics may be used for determining the magnitude of the change in the app. For gestures, such as S-CRC and S-CLC, where the azimuth variation is more compared to the elevation variation, instead of $v_{el}$, $v_{az}$ is used to determine the aforementioned metrics.

Although FIG. 11 illustrates an example 1100 of relevant features for the magnitude adjustment in a particular system function, various changes may be made to FIG. 4. For example, various changes to the gestures, the magnitude of the gestures, etc. could be made according to particular needs.

In the example of FIG. 7, each gesture in the vocabulary is associated with a specific system command. Once the gesture has been classified accurately and the corresponding magnitude for system action is determined using the process described previously herein, the system triggers the appropriate command with a specific magnitude (block 724). For example, swipe CUC may be configured to be used to scroll down while browsing. Depending on the elevation and radial distance traveled by the finger while performing the gesture, the appropriate amount of scrolling may be performed on the device.

As previously described herein, some gestures may be classified incorrectly. For example, the user may perform the gesture S-CUC and the gesture may get misclassified as S-CLC or S-CRC, where the horizontal movement is more compared to vertical movement. If either of the first three physical metrics are taken to determine the amount of adjustment, then the misclassification may not result in a large change in the system function associated with S-CLC/ S-CRC as the movement in the elevation axis is likely to be lower.

For certain user interface functions such as scrolling the screen or adjusting the volume, the user may perform the gesture repeatedly. In such a scenario, with each consecutive gesture, the maximum magnitude of change corresponding to the system function can be further adjusted. For example, the S-CUC gesture may be configured for scrolling down the screen. If the gesture is performed just once, then maximum amount of scroll may be 1000 pixels in the vertical dimension of the screen. This is the scroll amount, if the maximum displacement in the elevation direction is $R_M$ or more. Next, if the user performs another S-CUC within a certain time window of completing the first gesture, then the maximum scroll amount may be reconfigured to 1200 pixels. If another S-CUC is performed within the specified time window, the maximum scroll may be increased to 1500 pixels. In one embodiment, two design parameters are optimized based on user experience.

The first optimized parameter is the time difference between two gestures to be considered consecutive gestures. An absolute time difference may be considered in terms of number of frames, e.g., if the second gesture starts within 3 frames of declaring the end of the first gesture by the ADM. A relative time difference may be considered in terms for gesture length, e.g., if the first gesture performed by the user spans over 16 frames, then the electronic device may wait for 25% of the time (4 frames) for the second gesture to start. If the second gesture starts after 4 frames, the second gesture may be treated as a single gesture and may not adjust the maximum magnitude of system action.

The second optimized parameter is the scaling of the maximum magnitude of system action with consecutive frames. The maximum magnitude may be scaled based on the following expression:

$$F_M(n) = 2^{\kappa n} F_M(0), \tag{1}$$

where n is the sequence number of the gesture in the set of consecutive gestures, $F_M(0)$ is the default maximum magnitude associated for a single gesture, and $\kappa > 0$ is a constant that determines the scaling of the maximum magnitude. For a system function such as volume control, $\kappa$ may be a bit conservative and assumed to be a value less than 1. In contrast, for a system function such as screen scrolling, setting $\kappa$ greater than 1 may be considered. The value of $\kappa$ may be further optimized depending on the app type for better user experience.

Figure 12:
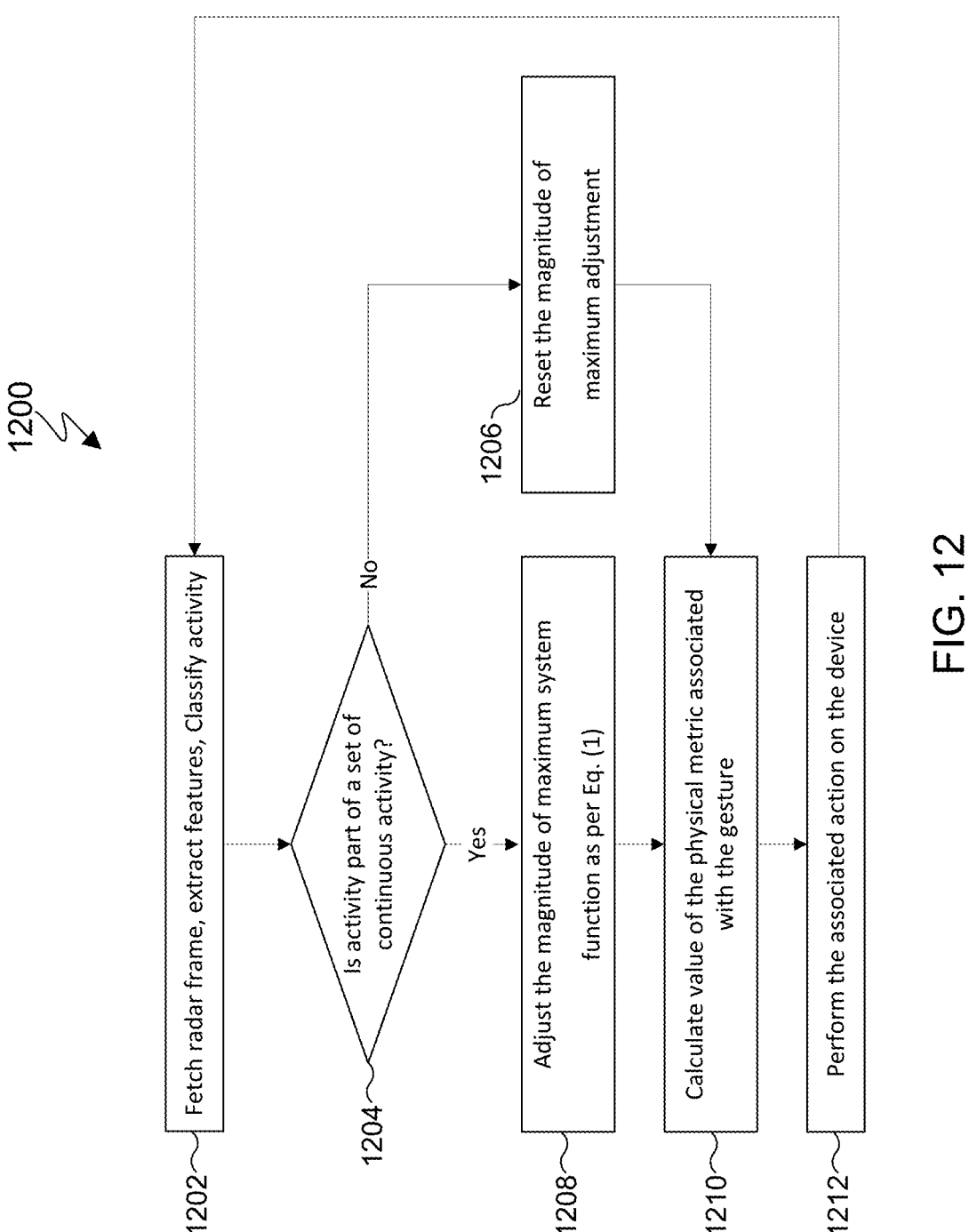
FIG. 12 illustrates a process for multiple gesture-based system control function according to embodiments of the present disclosure.

FIG. 12 illustrates a process 1200 for multiple gesture-based system control function according to embodiments of the present disclosure. An embodiment of the process illustrated in FIG. 12 is for illustration only. One or more of the components illustrated in FIG. 12 may be implemented in specialized circuitry configured to perform the noted functions or one or more of the components may be implemented by one or more processors executing instructions to perform the noted functions. Other embodiments of a process 1200 for multiple gesture-based system control function could be used without departing from the scope of this disclosure.

In the example of FIG. 12 the functions of block 1202 correspond with the functions described herein regarding FIG. 7. Once, the current gestural activity has been classified, a determination is made whether the gesture is a part of a set of consecutive gestures (block 1204). For example, as previously described herein, the difference may be evaluated between the frame where the last gesture end was declared and the frame corresponding to the start of the current gesture. If the frame difference is less than the specified threshold, then the current gesture is a part of the sequence of gestures and the process proceeds to block 1208. Otherwise, the process proceeds to block 1206, where the magnitude of the maximum adjustment is reset. At block 1208, the magnitude is adjusted for the maximum system function. Once the maximum magnitude is determined, for the current gesture, the value is determined of the physical metric considered for controlling the system function (block 1210) and the appropriate action is performed (block 1212).

Although FIG. 12 illustrates one example of a process 1200 for multiple gesture-based system control function, various changes may be made to FIG. 12. For example, while shown as a series of steps, various steps in FIG. 12 could overlap, occur in parallel, occur in a different order, or occur any number of times.

Since all the features that are used to determine the magnitude are also implicitly present in the features used to train the gesture classifier, in one embodiment the classifier trains itself with gestures performed with different intensities. S-CUC-low, S-CUC-med, S-CUC-high etc. The advantage of this approach is that the framework will be unified in the GC itself.

FIG. 13 illustrates a method 1300 for a gesture recognition system according to embodiments of the present disclosure. An embodiment of the method illustrated in FIG. 13 is for illustration only. One or more of the components illustrated in FIG. 13 may be implemented in specialized circuitry configured to perform the noted functions or one or more of the components may be implemented by one or more processors executing instructions to perform the noted functions. Other embodiments of a method 1300 for a gesture recognition system could be used without departing from the scope of this disclosure.

As illustrated in FIG. 13, the method 1300 begins at step 1302. At step 1302, an electronic device transmits and receives radar signals. At step 1304, the electronic device adjust a FoV associated with a transceiver comprised by the electronic device based on a plurality of radar frames corresponding to the radar signals. At block 1306, the electronic device extracts a plurality of feature vectors from the plurality of radar frames based on the adjusted FoV. At block 1308, the electronic device identifies an activity based on the plurality of feature vectors. At block 1310, the electronic device identifies a gesture that corresponds with the activity. At block 1312, the electronic device performs a gesture magnitude operation. Finally, at block 1314, the electronic device performs an action based on the gesture and a result of the gesture magnitude operation.

Although FIG. 13 illustrates one example of a method 1300 for a gesture recognition system, various changes may be made to FIG. 13. For example, while shown as a series of steps, various steps in FIG. 13 could overlap, occur in parallel, occur in a different order, or occur any number of times.

Any of the above variation embodiments can be utilized independently or in combination with at least one other variation embodiment. The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claim scope. The scope of patented subject matter is defined by the claims.

What is claimed is:

1. An electronic device comprising:
a transceiver configured to transmit and receive radar signals; and
a processor operatively coupled to the transceiver, the processor configured to:
adjust a radius of an operational field of view (FoV) of the electronic device to be contained within a system FoV associated with the transceiver based on a plurality of radar frames corresponding to the radar signals;
extract a plurality of feature vectors from the plurality of radar frames based on the adjusted operational FoV;
identify an activity based on the plurality of feature vectors;
identify a gesture that corresponds with the activity;
perform a gesture magnitude operation; and
perform an action based on the gesture and a result of the gesture magnitude operation,
wherein the operational FoV is a virtual circular boundary having a radius proportional to a target distance from the transceiver.

2. The electronic device of claim 1, wherein the gesture magnitude operation comprises at least one of:
a magnitude detection operation; and
a magnitude adjustment operation.

3. The electronic device of claim 2, wherein to perform the magnitude detection operation, the processor is further configured to:
determine a maximum displacement of a target in at least one of an azimuth direction or an elevation direction;
determine a maximum velocity of the target; and
determine a magnitude of the gesture based on the maximum displacement and the maximum velocity of the target.

4. The electronic device of claim 2, wherein to perform the magnitude adjustment operation, the processor is further configured to:
determine whether the gesture is associated with a set of consecutive gestures;
if gesture is associated with a set of consecutive gestures, adjust a magnitude of a maximum system function;
if the gesture is not associated with a set of consecutive gestures, reset the magnitude of the maximum system function; and
determine a magnitude of the gesture, wherein the action is performed based on the magnitude of the gesture and the magnitude of the maximum system function.

5. The electronic device of claim 4, wherein to determine whether the gesture is associated with a set of consecutive gestures, the processor is further configured to:
determine a time difference between the gesture and a previous gesture;
determine if the time difference exceeds a threshold; and
if the time difference does not exceed the threshold, determine that the gesture is associated with the set of consecutive gestures.

6. The electronic device of claim 1, wherein:
the electronic device further comprises an output device operatively coupled to the processor; and
to adjust the operational FOV associated with the transceiver, the processor is further configured to:
cause the output device to prompt a user of the electronic device to move a target to a boresight location of the transceiver.

7. The electronic device of claim 6, wherein prompting the user to move the target to a boresight location comprises at least one of:
indicating for the user to move the target in a backward direction;
indicating for the user to move the target in a forward direction; and
indicating for the user to move the target in a particular angular direction.

8. The electronic device of claim 1, wherein to adjust the operational FoV associated with the transceiver, the processor is further configured to:
determine a current start position of the gesture; and
adjust an operational FoV boundary based on a distance of a target from the transceiver and the current start position.

9. The electronic device of claim 8, wherein to determine the current start position, the processor is further configured to:
determine whether an existing start position is stale;
if the existing start position is stale, set a current location of the target as the current start position; and
if the existing start position is not stale, determine whether a distance between the existing start position and the current location of the target is less than a predefined threshold, wherein:
if the distance between the existing start position and the current location of the target is not less than the predefined threshold, the current location of the target is set as the current start position; and
if the distance between the existing start position and the current location of the target is less than the predefined threshold, the existing start position is set as the current start position.

10. The electronic device of claim 1, wherein:
the operational FoV comprises a virtual circular boundary within a boundary of the system FoV;
to adjust the operational FoV, the processor is further configured to adjust a radius of the virtual circular boundary; and
the radius of the virtual circular boundary is proportional to a maximum magnitude of a command triggered by a gesture.

11. A method of operating an electronic device, the method comprising:

25 transmitting and receiving radar signals;
adjusting an operational field of view (FoV) of the electronic device to be contained within a system FoV associated with a transceiver comprised by the electronic device based on a plurality of radar frames corresponding to the radar signals;
extracting a plurality of feature vectors from the plurality of radar frames based on the adjusted operational FoV;
identifying an activity based on the plurality of feature vectors;
identifying a gesture that corresponds with the activity;
performing a gesture magnitude operation; and
performing an action based on the gesture and a result of the gesture magnitude operation,
wherein the operational FoV is a virtual circular boundary having a radius proportional to a target distance from the transceiver.

12. The method claim 11, wherein performing the gesture magnitude operation comprises at least one of:
performing a magnitude detection operation; and
performing a magnitude adjustment operation.

13. The method of claim 12, performing the magnitude detection operation comprises:
determining a maximum displacement of a target in at least one of an azimuth direction or an elevation direction;
determining a maximum velocity of the target; and
determining a magnitude of the gesture based on the maximum displacement and the maximum velocity of the target.

14. The method of claim 12, wherein performing the magnitude adjustment operation comprises:
determining whether the gesture is associated with a set of consecutive gestures;
if gesture is associated with a set of consecutive gestures, adjusting a magnitude of a maximum system function;
if the gesture is not associated with a set of consecutive gestures, resetting the magnitude of the maximum system function; and
determining a magnitude of the gesture,
wherein the action is performed based on the magnitude of the gesture and the magnitude of the maximum system function.

15. The method of claim 14, determining whether the gesture is associated with a set of consecutive gestures comprises:
determining a time difference between the gesture and a previous gesture;
determining if the time difference exceeds a threshold; and
if the time difference does not exceed the threshold, determining that the gesture is associated with the set of consecutive gestures.

16. The method of claim 11, wherein adjusting the operational FoV associated with the transceiver comprises prompting a user of the electronic device to move a target to a boresight location of the transceiver.

17. The method of claim 16, wherein prompting the user to move the target to a boresight location comprises at least one of:
indicating for the user to move the target in a backward direction;
indicating for the user to move the target in a forward direction; and
indicating for the user to move the target in a particular angular direction.

18. The method of claim 11, wherein adjusting the operational FoV associated with the transceiver comprises:

determining a current start position of the gesture; and adjusting an operational FoV boundary based on a distance of a target from the transceiver and the current start position.

19. The method of claim 18, wherein determining the current start position comprises:

determining whether an existing start position is stale;

if the existing start position is stale, setting a current location of the target as the current start position; and if the existing start position is not stale, determining whether a distance between the existing start position and the current location of the target is less than a predefined threshold, wherein:

if the distance between the existing start position and the current location of the target is not less than the predefined threshold, the current location of the target is set as the current start position; and if the distance between the existing start position and the current location of the target is less than the predefined threshold, the existing start position is set as the current start position.

20. The method of claim 11, wherein the gesture is one of:

a swipe center-right-center (CRC);

a swipe center-left-center (CLC);

a swipe center-up-center (CUC); and a swipe center-down-center (CDC).

\* \* \* \* \*